(12) United States Patent
Janssen et al.

(10) Patent No.: US 10,279,293 B2
(45) Date of Patent: May 7, 2019

(54) CASCADE IMPACTOR

(71) Applicant: POLYTEC PLASTICS GERMANY GMBH & CO. KG, Lohne (DE)

(72) Inventors: Hans Janssen, Dinklage (DE); Christian Meyer, Löningen (DE); Christoph Leson, Dinklage (DE)

(73) Assignee: Polytec Plastics Germany GMBH & CO. KG (DE)

( * ) Notice: Subject to any disclaimer, the term of this patent is extended or adjusted under 35 U.S.C. 154(b) by 98 days.

(21) Appl. No.: 15/328,803

(22) PCT Filed: Jul. 10, 2015

(86) PCT No.: PCT/EP2015/065844
§ 371 (c)(1),
(2) Date: Jan. 24, 2017

(87) PCT Pub. No.: WO2016/015976
PCT Pub. Date: Feb. 4, 2016

(65) Prior Publication Data
US 2017/0225107 A1 Aug. 10, 2017

(30) Foreign Application Priority Data
Jul. 30, 2014 (DE) .................. 10 2014 214 973

(51) Int. Cl.
*B01D 53/22* (2006.01)
*B01D 45/08* (2006.01)
(Continued)

(52) U.S. Cl.
CPC ............. *B01D 45/08* (2013.01); *F01M 13/04* (2013.01); *F02M 35/0226* (2013.01); *F01M 2013/0433* (2013.01)

(58) Field of Classification Search
CPC ........ B01D 45/08; B01D 45/00; B01D 45/04; F01M 2013/0433; F01M 13/04; F02M 35/0226
See application file for complete search history.

(56) References Cited

U.S. PATENT DOCUMENTS 1,868,755 A * 7/1932 Mount .................... C01B 32/55
62/602
3,693,457 A * 9/1972 Pilat .................... G01N 15/0255
55/325

(Continued)

FOREIGN PATENT DOCUMENTS

CN 103764252 A 4/2014
DE 10 2008 044 857 B4 8/2011
(Continued)

OTHER PUBLICATIONS

International Search Report for International Application No. PCT/EP2015/065844 dated Sep. 17, 2015.

*Primary Examiner* — Anthony R Shumate
(74) *Attorney, Agent, or Firm* — Seth L. Hudson; Clements Bernard Walker, PLLC

(57) ABSTRACT

The invention relates to a cascade impactor having a first stage comprising a plate (2) with fixed bores as gas inlet and at least a first impact wall (4) with a variable distance from the plate (2) as well as at least a second stage having a fixed second impact wall (5), which is arranged in the flow direction downstream of the first impact wall (4).

7 Claims, 1 Drawing Sheet

(51) Int. Cl.
*F02M 35/022* (2006.01)
*F01M 13/04* (2006.01)

(56) References Cited

U.S. PATENT DOCUMENTS

| | | | | |
|---|---|---|---|---|
| 4,327,594 A | * | 5/1982 | Nelson | B01D 45/08 73/863.22 |
| 8,152,884 B1 | * | 4/2012 | Severance | B01D 45/08 55/462 |
| 2003/0075046 A1 | * | 4/2003 | Lenzing | B01D 45/06 95/267 |
| 2009/0078062 A1 | * | 3/2009 | Maheshwari | G01N 1/2208 73/863.22 |
| 2009/0120854 A1 | * | 5/2009 | Parikh | B01D 45/08 210/137 |
| 2009/0193770 A1 | * | 8/2009 | Holzmann | B01D 45/06 55/318 |
| 2010/0288057 A1 | * | 11/2010 | Witham | B01D 45/08 73/863.22 |
| 2013/0032115 A1 | * | 2/2013 | Zitarosa | F01M 13/0011 123/188.8 |
| 2013/0312720 A1 | * | 11/2013 | Aquino | F02M 25/06 123/573 |
| 2014/0165977 A1 | * | 6/2014 | Copley | B01D 45/08 123/573 |
| 2017/0145879 A1 | * | 5/2017 | Ratajczack | F01M 13/04 |

FOREIGN PATENT DOCUMENTS

| | | |
|---|---|---|
| DE | 10 2010 036 399 A1 | 1/2012 |
| EP | 2 378 090 A1 | 10/2011 |
| WO | 02/32546 A1 | 4/2002 |
| WO | 2013/017832 A1 | 2/2013 |

\* cited by examiner

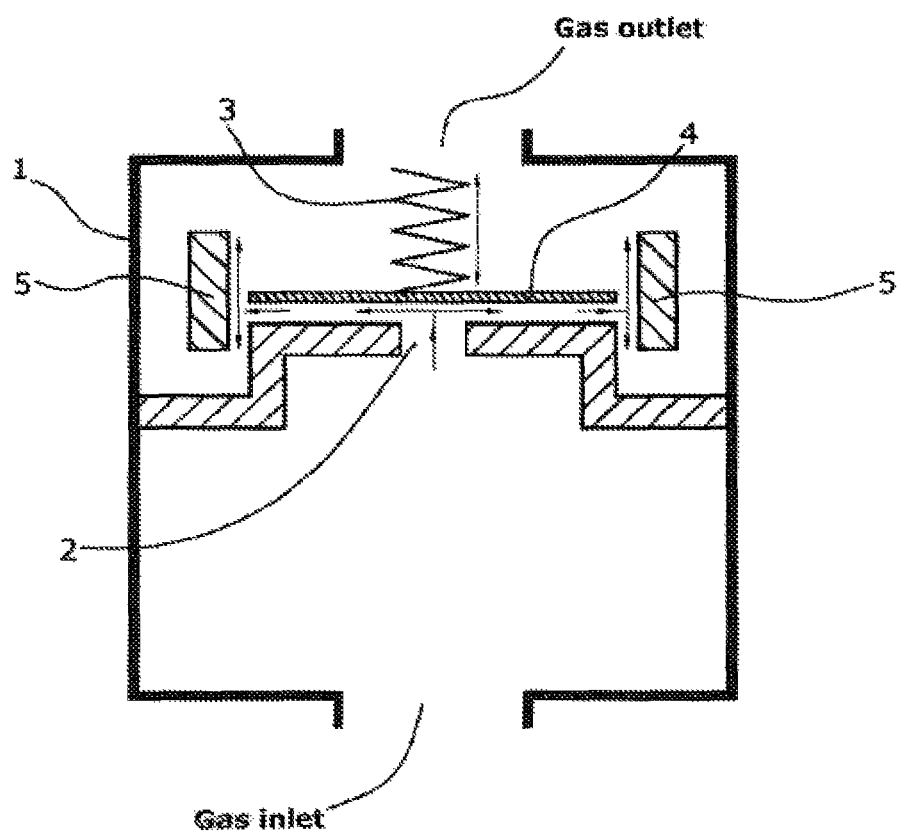

CASCADE IMPACTOR

FIELD OF THE INVENTION

The invention relates to a cascade impactor with several stages.

BACKGROUND

A cascade impactor is a serial connection of nozzle plates. The nozzle diameter, which is reduced from stage to stage, usually causes the gas velocity to increase. Between the individual nozzle plates, there are baffles covered with filter disks. A gas flow loaded with solids (particles) or liquids impinges on the filter and is deflected there. While fine loads follow the flow for low gas velocities, larger particles or droplets are deposited on the filter. The increasing gas velocity from cascade to cascade thereby separates the individual grain or liquid fractions. Cascade impactors may also be employed immediately in hot and chemically aggressive gases.

EP 2 378 090 A1 relates to an oil mist separator (1) for a crankcase ventilation means. It includes a first separator unit (2), which has at least one filter body (10) which is arranged in a blow-by gas path (11) in such a manner that blow-by gas can pass through it. A second separator unit (3) is provided, which is connected in parallel to said first separator unit (2) and arranged in a bypass path (18) that bypasses the first separator unit (2). Using a bypass valve (4), the bypass path (18) can be opened as soon as a differential pressure at the first separator unit (2) exceeds a predefined value.

The gas flows through two or more impactor stages arranged behind each other. The impactor as a separator and also an impactor cascade consisting of several stages are known. However, these individual stages are not variable. This means that the bore diameters and plate distances have a fixed design.

SUMMARY OF THE INVENTION

It is the object of the present invention to provide a variable cascade impactor in which the separating performance can be adapted to the required circumstances.

A cascade impactor through which gas flows, comprising a first stage having a plate (2) with at least one bore as gas inlets, a first baffle (4) variably spaced away from said plate (2) along the gas flow path, and a second stage arranged downstream of the gas flow and downstream of the first baffle (4), comprising a fixed second baffle (5).

DESCRIPTION OF THE INVENTION

The above object is achieved by a cascade impactor comprising a first stage including a plate 2 with fixed bores as a gas inlet and at least one first baffle 4 with a variable distance to the plate 2, and at least one second stage arranged downstream of the first baffle 4 and comprising a fixed second baffle 5.

According to FIG. 1, the first stage consists of a plate with small fixed bores 2 and a baffle 4 downstream thereof. This baffle 4 does not necessarily have a fixed distance, but optionally it is spring-loaded 3, thereby having a small distance to the bores 2 for low volume flows. When the volume flow increases, the distance of the baffle 4 to the bores 2 may increase, and a larger gas quantity can pass without a great pressure rise. This allows for a high degree of separation at the first impactor stage, because the distance of the baffle 4 to the bores can be minimized, and this distance is a parameter for the separation performance of an impactor. At the same time, high volume flows can be passed through effectively without a great pressure rise.

The special feature of the cascade impactor according to the invention is the fact that a second impactor stage follows after the first stage. Thus, the gas velocity in the variable gap of the first stage is utilized to throw the droplets or solid particles present in the gas with a high velocity onto a second baffle 5, which now has a fixed distance. Because of the optional spring bias 3, a high gas velocity is achieved for low and high volume flows.

At the second fixed baffle 5, the gas can escape downwards and upwards, so that the jet can impinge vertically onto the baffle 5. This jet division is important because the gas thereby can escape in two opposite directions, and the droplets or solid particles are enabled to reach the second baffle 5. Upon contact with the baffle 5, the droplets or solid particles are separated.

In a preferred embodiment of the present invention, the cascade impactor only consists of first and second stages. Although basically several impactor stages may be present, in the vast majority of cases, the above mentioned two stages are sufficient to remove a sufficient amount of droplets or solid particles from a gas flow because of the present invention.

The angle of the mutual arrangement of the baffle surfaces can be varied arbitrari-ly. However, the closer the angle corresponds to a value of 90°, the greater is its separation performance. Accordingly, it is particularly preferred according to the present invention to orient the baffle surfaces of the first and second baffles 4, 5 mutually at an angle of 60 to 120°, especially from 85 to 95°. It is even more preferred according to the present invention if the baffle surfaces of the first and second baffles 4, 5 are at an angle of 90° to one another. Naturally, the same applies to further subsequent baffles, if required.

According to the invention, the baffle 4 may be installed with a variable distance to the plate 2 by the action of a force acting against the gas flow. In principle, this is possible by using a mechanical or electric control. However, according to the present invention, it is particularly preferred if the baffle 4 is pressed against plate 2 by a spring 3. Thus, the distance is varied by the pressure of the gas flow. As the volume flow increases, the baffle 4 is pressed against the spring 3, and thus, the distance to plate 2 is increased, opening a corresponding flow gap.

More particularly, the gas is directed against the baffle 5 at a high velocity through this flow gap.

Because of this gas flow, the gas can flow off the baffle 5 in both directions.

In another preferred embodiment of the present invention, the baffle 4 and the spring 3 may be designed integrally as a spring plate. This results in further structural simplifications of the cascade impactor according to the invention.

Instead of a single bore 2 as represented in FIG. 1, a large number of bores, for example, from 20 to 100, may be provided. More particularly according to the present invention, the bores are covered by an integral spring plate.

The invention claimed is:

1. A cascade impactor comprising a first stage including a plate (2) with fixed bores as a gas inlet and at least one first baffle (4) pressed against the plate (2) by a spring (3), and at least one second stage arranged downstream of the first baffle (4) and comprising a fixed second baffle (5).

2. The cascade impactor according to claim 1, consisting of first and second stages.

3. The cascade impactor according to claim 1, characterized in that the baffle surfaces of the first and second baffles (4, 5) are at an angle of 60° to 120° to one another.

4. The cascade impactor according to claim 1, characterized in that the baffle surfaces of the first and second baffles (4, 5) are at a mutual angle of 90° to one another.

5. The cascade impactor according to claim 1, characterized in that, as the gas volume flow increases, the first baffle (4) is pressed against the spring (3) and thus is removed from plate (2), opening a flow gap.

6. The cascade impactor according to claim 5, characterized in that the gas is directed against the baffle (5) at a velocity through said flow gap.

7. The cascade impactor according to claim 1, characterized in that the gas flows off the baffle (5) in both directions.

* * * * *

UNITED STATES PATENT AND TRADEMARK OFFICE
CERTIFICATE OF CORRECTION

PATENT NO. : 10,279,293 B2
APPLICATION NO. : 15/328803
DATED : May 7, 2019
INVENTOR(S) : Hans Janssen, Christian Meyer and Christoph Leson Page 1 of 1

It is certified that error appears in the above-identified patent and that said Letters Patent is hereby corrected as shown below:

On the Title Page

Column 1, Item (30) Foreign Application Priority Data:
Change "Jul. 30, 2014 (DE) ............... 10 2014 214 973"
To Jul. 30, 2014 (DE) ............... 10 2014 214 973.8

Signed and Sealed this
Eighteenth Day of June, 2019

Andrei Iancu
*Director of the United States Patent and Trademark Office*